United States Patent
Koch et al.

(10) Patent No.: US 6,700,616 B1
(45) Date of Patent: *Mar. 2, 2004

(54) STILL PHOTOGRAPHIC CAMERA AND IMAGE GENERATING PROCESS

(75) Inventors: Hans Carl Koch, Flurlingen (CH); Karl Gfeller, Langwiesen (CH)

(73) Assignee: Sinar, AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/637,115

(22) Filed: Aug. 11, 2000

Related U.S. Application Data

(63) Continuation of application No. 08/495,465, filed as application No. PCT/CH94/00227 on Nov. 28, 1994, now Pat. No. 6,141,051.

(30) Foreign Application Priority Data

Nov. 26, 1993 (CH) .............................................. 3542/93

(51) Int. Cl.[7] .............................................. H04N 5/232
(52) U.S. Cl. ................... 348/350; 348/333.06
(58) Field of Search .................. 348/345, 346, 348/349, 350, 354, 362, 364, 366, 373, 333.01, 333.02, 333.03, 333.05, 333.06, 333.12

(56) References Cited

U.S. PATENT DOCUMENTS

| | | | | |
|---|---|---|---|---|
| 4,496,981 A | * | 1/1985 | Ota | 348/294 |
| 5,343,303 A | * | 8/1994 | Delmas | 348/346 |
| 5,629,735 A | * | 5/1997 | Kaneda et al. | 348/350 |

FOREIGN PATENT DOCUMENTS

JP        4273670        9/1992

OTHER PUBLICATIONS

English Abstract of JP 04273670, Patent Abstracts of Japan.

* cited by examiner

*Primary Examiner*—Tuan Ho
(74) *Attorney, Agent, or Firm*—Dykema Gossett PLLC

(57) ABSTRACT

An electronic still camera includes an opto-electric transducer arrangement having a matrix of optical-to-electric converter elements for outputting parallel electrical signals providing a first electronic representation of an optical image received thereon from a lens, an electro-optical transducer arrangement (view screen) having a matrix of electrical-to-optical converter elements for converting a second electronic representation of an Image to an optical image, and a window-selecting unit for selecting a size and location of the second electronic representation within the first electronic representation,

34 Claims, 10 Drawing Sheets

STILL PHOTOGRAPHIC CAMERA AND IMAGE GENERATING PROCESS

CROSS REFERENCE TO RELATED APPLICATION

Figure 1:
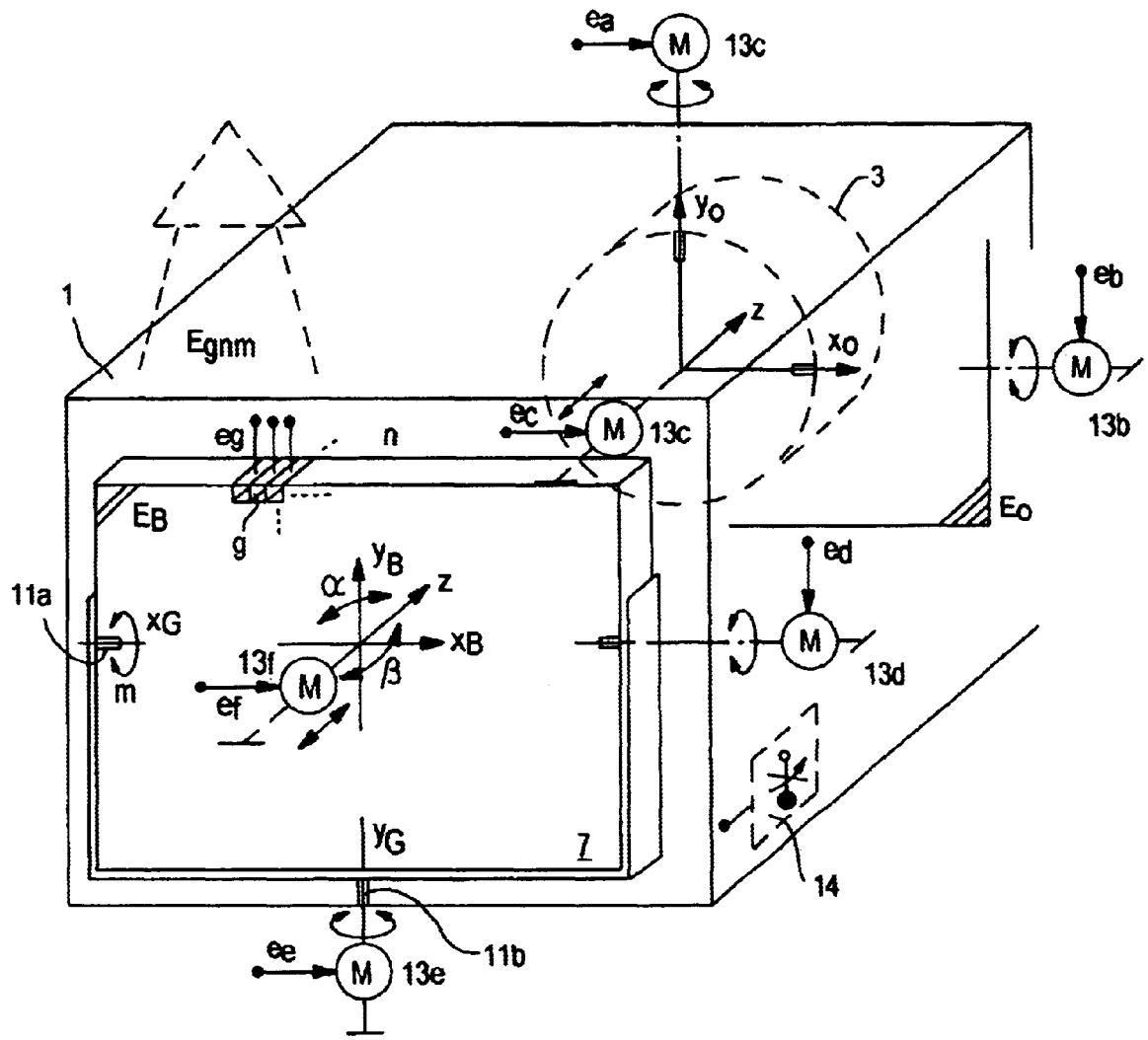

This is a continuation of application Ser. No. 08/495,465, filed Aug. 28, 1995 now U.S. Pat. No. 6,141,051, which derived from PCT/CH94/00227, filed Nov. 28, 1994.

BACKGROUND OF THE INVENTION

Field of the Invention

The present invention relates to a still photographic camera of the kind specified in claim 1, preamble and a method according to the preamble of claim 24, as well.

A camera of the kind mentioned is known by the DE-PS-34 33 412. The drawback of same is that a ground-glass plate is foreseen as view finder and thus as first imaging device in the image plane and a recording medium in form of a film is brought into position of the ground-glass plate in order to finally take a picture of the scene.

The present invention makes to its object to provide a still photographic camera at which simultaneously pictures can be taken and the picture taken can be viewed, at which no mechanical displacements at all must be made in order to go from the viewing mode into the picture taking mode, which, furthermore can be structured extremely compact and allows options which can be realized without a disturbing of the compact structure, which thus can be completed with regard to realized operational functions extremely flexible.

For this object the inventive camera is characterized by the characterizing part of claim 1.

Because a transducer arrangement of optoelectrical transducer elements is foreseen in the imaging plane, the possibility is arrived at the inventive still photographic camera to realize practically all functions necessary for taking pictures by a processing of the electrical output signals of the transducer.

Because the lens according to claim 2 is supported to pivot about two axes perpendicular to each other an optimization of the focus becomes possible without changing the perspective of the image set by means of the position of the transducer arrangement.

Following the wording of claim 3 and 5, resp., the perspective of the image in the position of the image plane is i.e. set initially. It is, thereby, however by all means possible to fix the transducer arrangement onto the casing and to select the perspective of the image by a shifting of the camera.

Furthermore, according to claim 4, for setting the focus the lens and/or the transducer arrangement is/are displaceable in the direction of the focus.

According to the wording of claim 6 preferably motor driven positioning means are foreseen in order to set the mentioned movements of the transducer and/or the lens. Thereby the possibility is provided as still is to be explained, to set by judging of the focus by means of a camera computer and regress onto the positioning members, the focus of the imaging focus automatically in the sense of an automatic controlling of the focus and to optimize it, resp., via the imaging plane.

At the presently preferred embodiment the transducer arrangement is formed in accordance with claim 7 by CCD-transducer elements.

An extremely preferred embodiment of the camera in accordance with the invention characterizes itself further in accordance with the wording of claim 8.

By the provision of a further transducer arrangement of optoelectronic transducer elements, tied to the casing of the camera, a viewer image is produced electronically which allows with the storing of the image to simultaneously view the stored image.

With the same transducer arrangement, furthermore the information needed for the intercommunication between the camera computer and the operator is preferably displayed, in accordance with the wording of claim 15.

Because the camera in accordance with the invention is structured in a further, extremely preferred embodiment in accordance with the wording of claim 9, the possibility is given at select a window of the scene electronically from the scene to be photographed and to subject same to a respective specific further processing. It is thereby possible, following the wording of claim 10, to realize an electronic zoomfunction in that the image window selected at the window selecting unit can be switched with a preset scale of increase or decrease onto the further transducer arrangement of optoelectronic transducer elements.

By this electronic zoom function an exchanging or adjusting of the objective will become superfluous in many cases.

A further preferred embodiment of the camera in accordance with the invention according to claim 12 leads to the possibility of an automatic adjusting of the focus and optimization and/or a automatic setting of the illumination and/or an automatic setting of the color composition of the light of the image, resp. Obviously, in place of or additionally to the controlling operation of an adjusting member merely a display can be made and the desired adjusting be accomplished manually.

Furthermore, in order not only to be able taking the information relative to a single image window selected at the window selecting unit, but to conduct an optimizing over an entire image, it is proposed to design the camera according to the invention in accordance with the wording of claim 13. By this it becomes possible to save the corresponding data for several, sequentially or simultaneously selected windows and to set from the entirety of these informations and data, resp. optimal setting parameters for focus and/or illumination and/or color composition of image light or to adjust these manually.

At a further preferred embodiment of the camera the actual image data memory is integrated in the casing of the camera, for instance in form of a mini-disc.

By the provision of a gravity sensor an automatic recognizing of the position of the camera will be made possible, e.g. parallelity of edges of an image relative to the vertical direction.

In accordance with the invention the method is characterized by the characterizing part of claim 24.

The determined ACTUAL image size can thereby be for instance the averaged focus over the entire image, the distribution of the focus over the entire image or the focus at individual sections of the image, etc. The ACTUAL-focus of the image as ACTUAL-image value can preferably be determined directly from the output signals of the optoelectric transducers. The ACTUAL-image value can, however, understood in a more general way, be also the modulation-transmittal function given by a foreseen camera lens or a phase-transmittal function or, combined, the complex optical transmittal function and will be then indirectly determined based on the knowledge of this modulation-transmittal function of the lens by a lens identification at the camera.

By intervening into the optical path of the camera, i.e. for instance by changing of the focusing and/or by a signal-technical intervention onto the electrical path at the output side of the transducer arrangement at the camera, the image defined by the electrical signals is changed, such that at least a RATED image value is arrived at, for instance a given focus or focus distribution or a desired dependency of the modulation-transmittal function of a invariable value which is independent from same, such as for instance the aperture value or image angle or, generally, for increasing or decreasing of the modulation-transmittal function, possibly differing for different areas of the image.

Generally, the "electronic image" represented by electrical signals of the transducer elements can be changed or optimized, resp., by techniques known in the field of communication techniques. The corresponding processing proceeds obviously digitally.

Preferred embodiments of the method in accordance with the invention are specified in the claims 25 to 33.

In the following, the invention will be explained by example based on figures.

Figure 2:
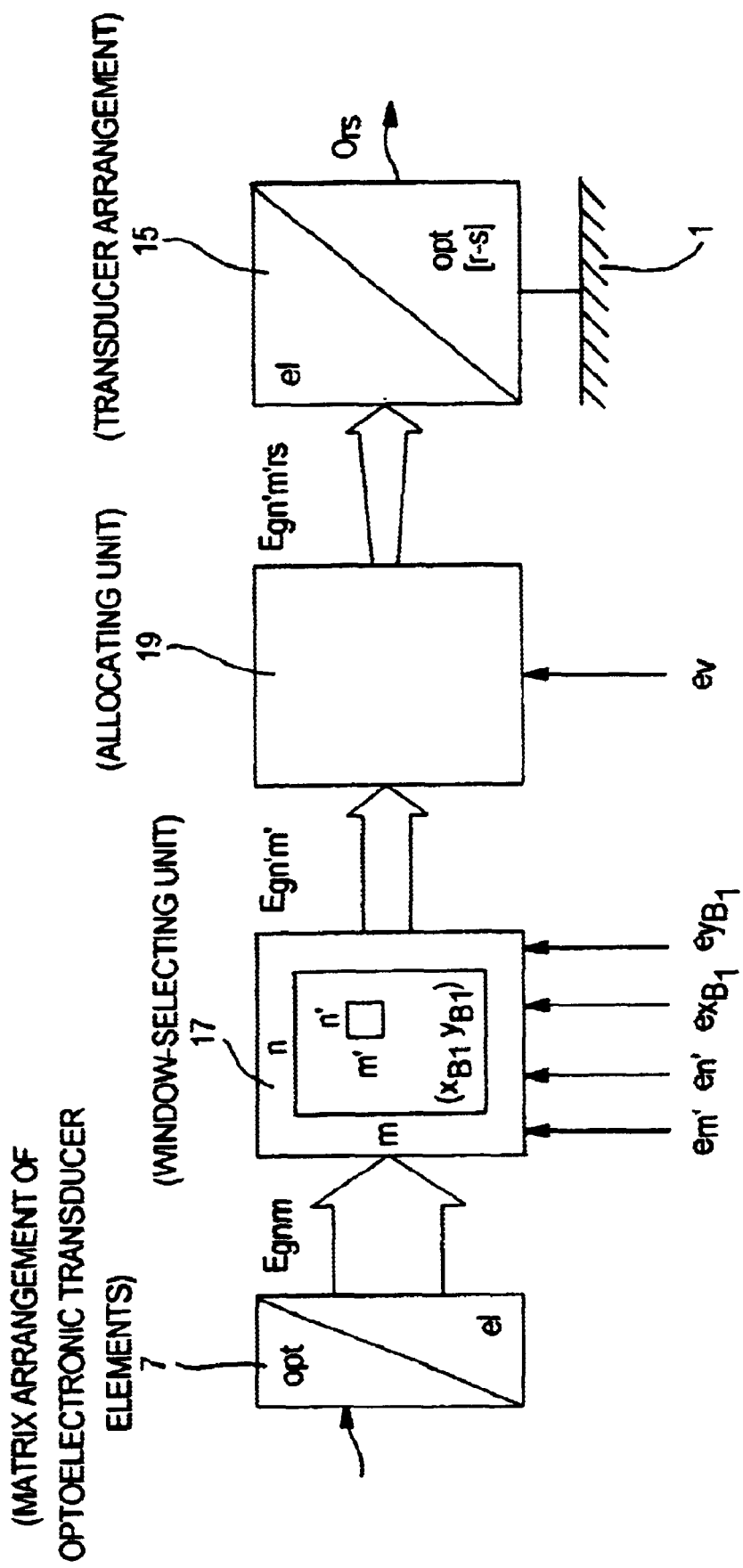
Figure 3:
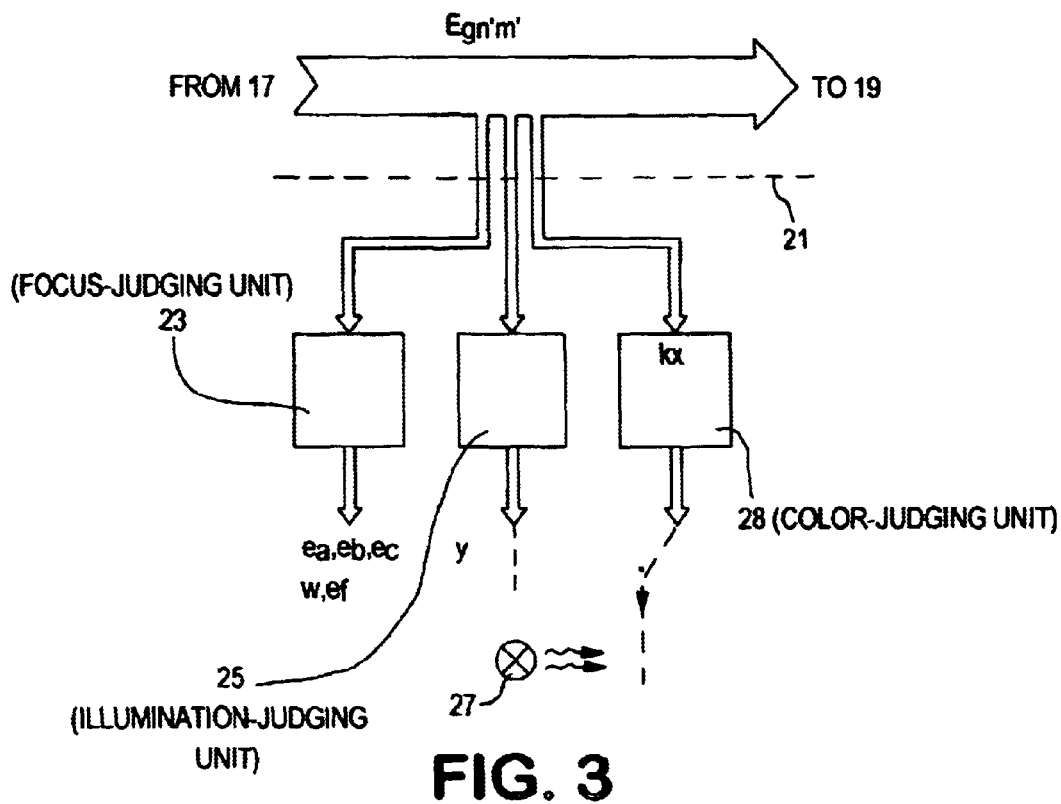
Figure 4:
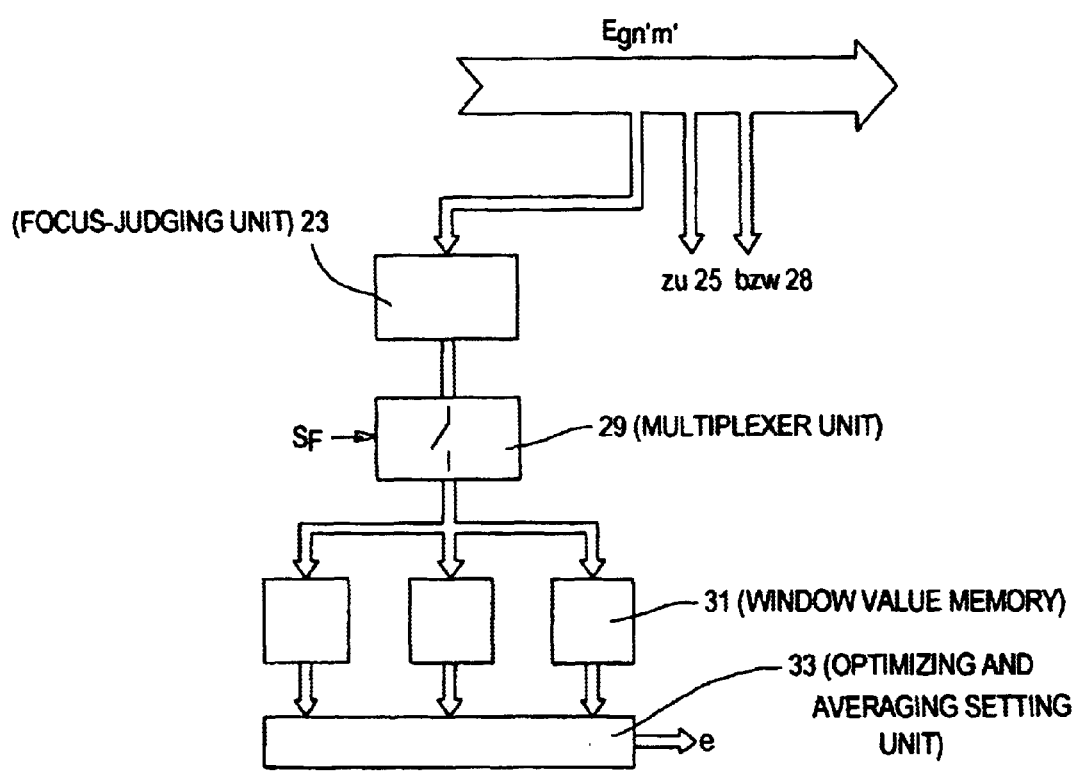
Figure 5:
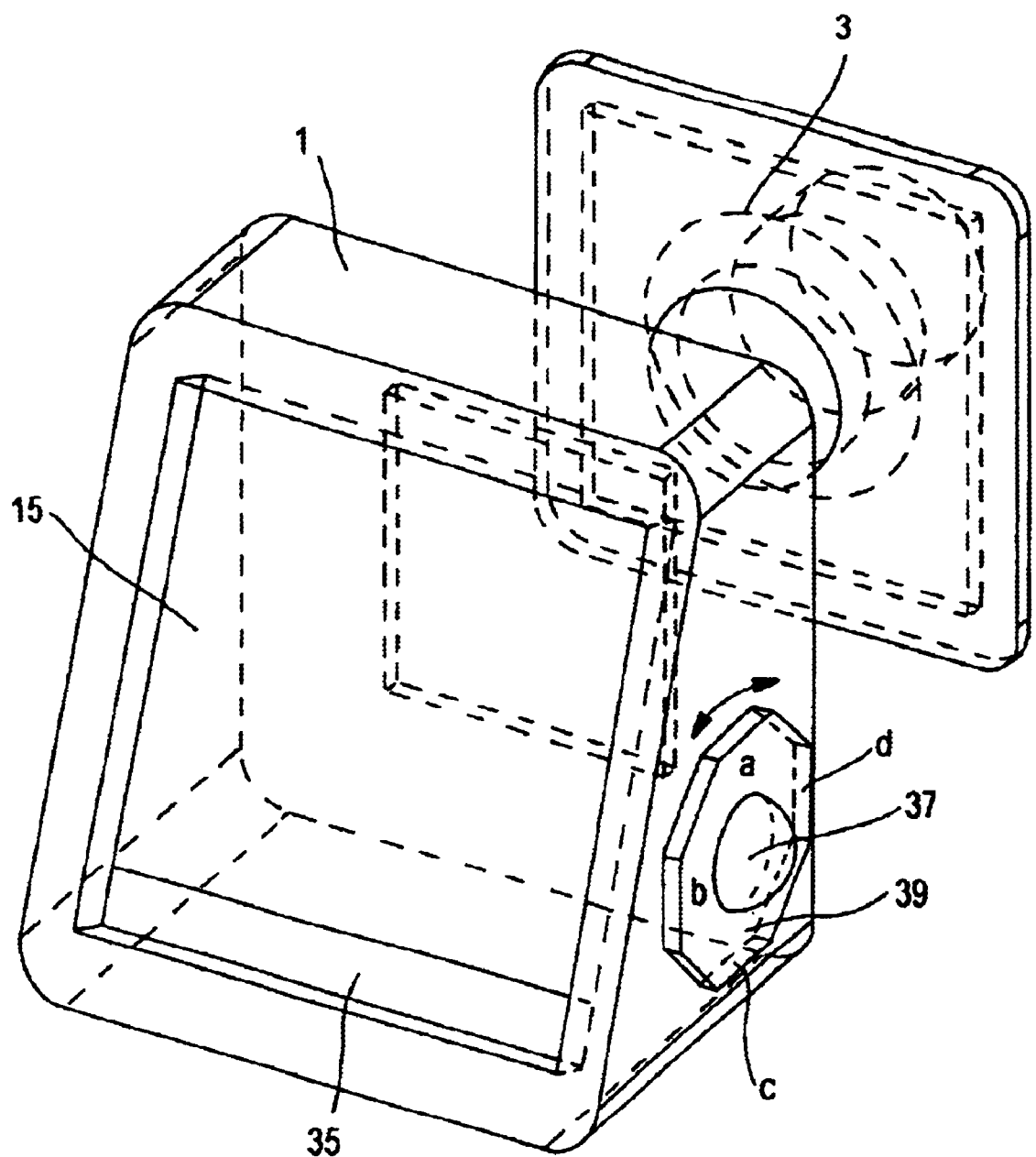
Figure 7:
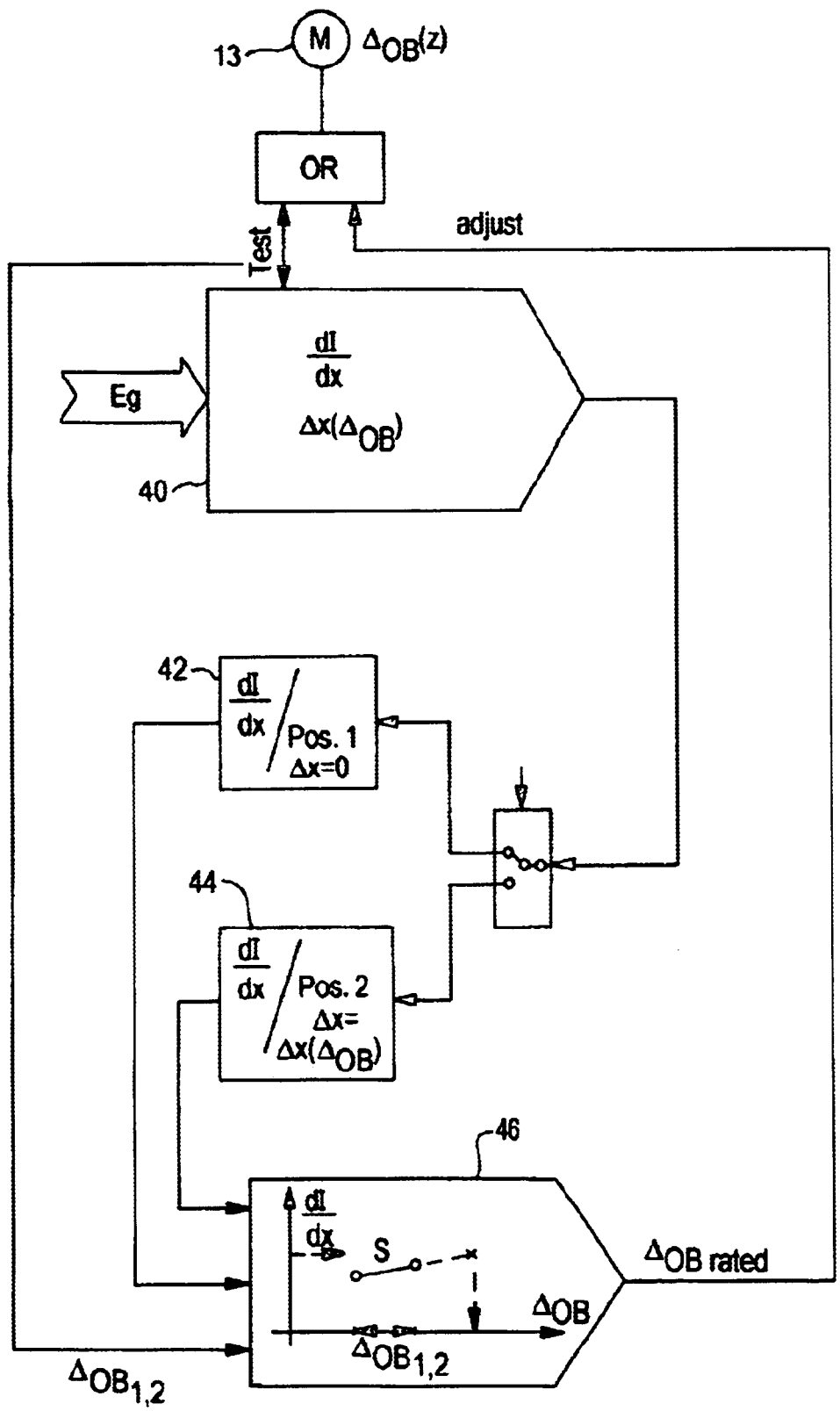
Figure 8:
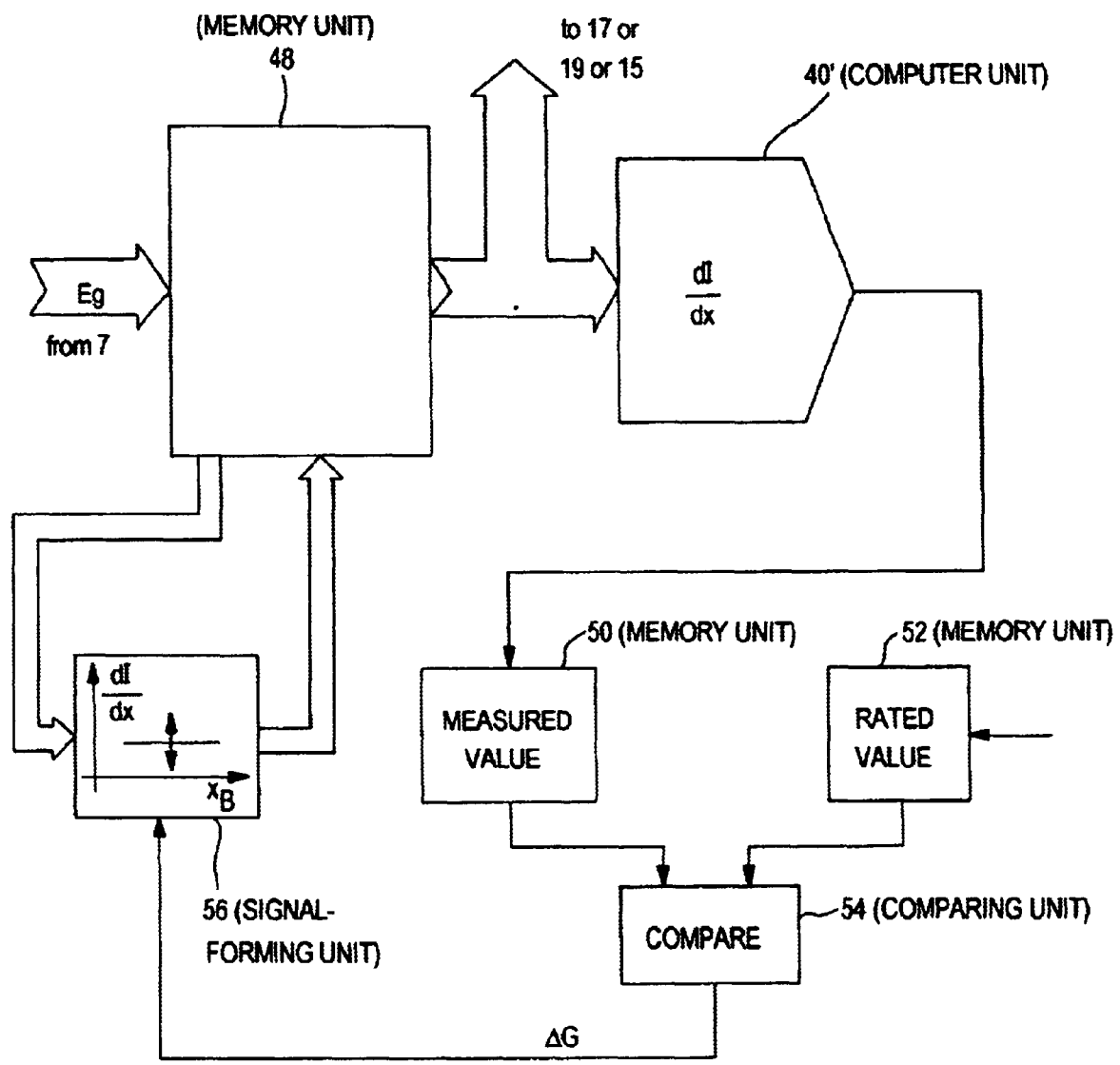
Figure 9:
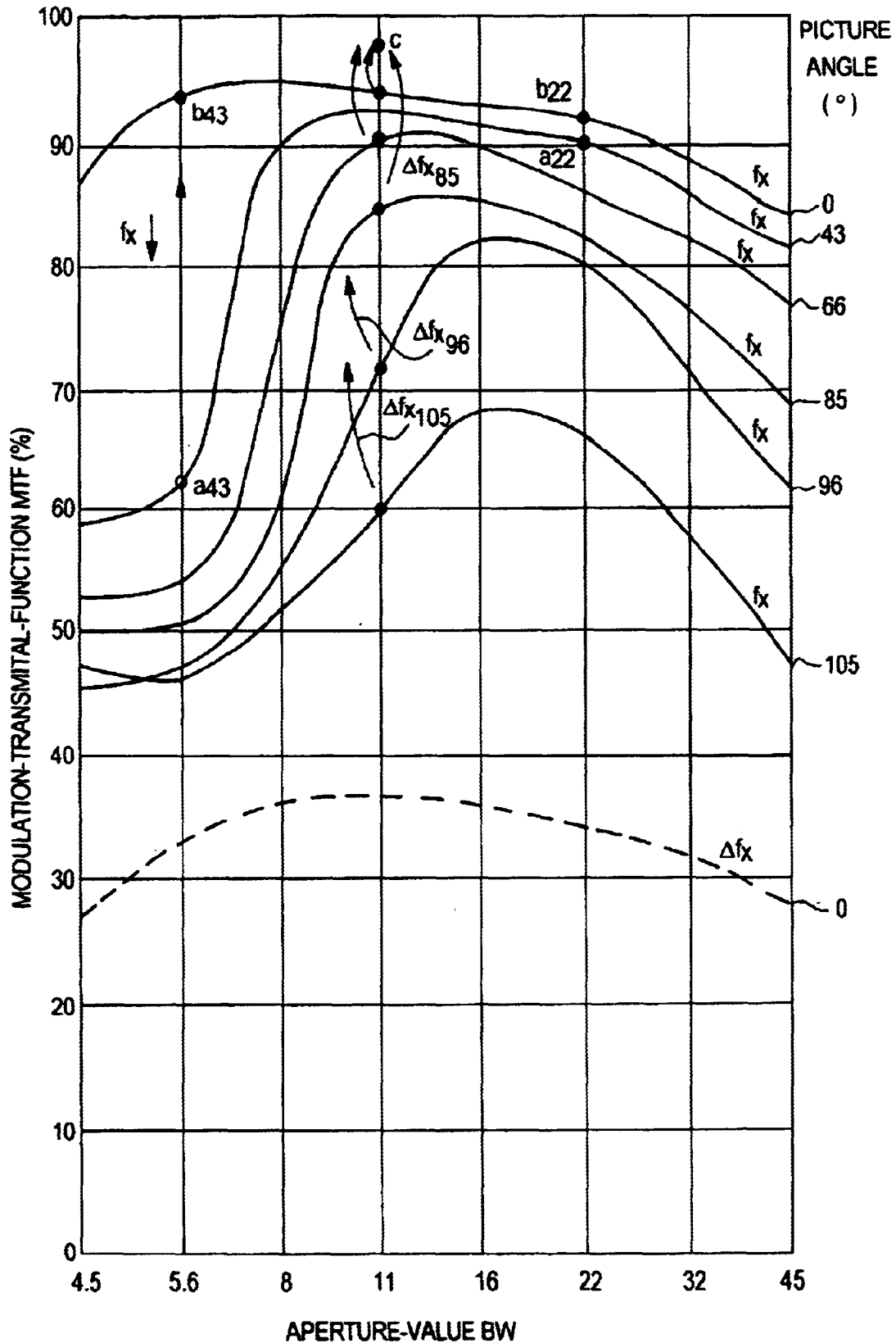
Figure 10:
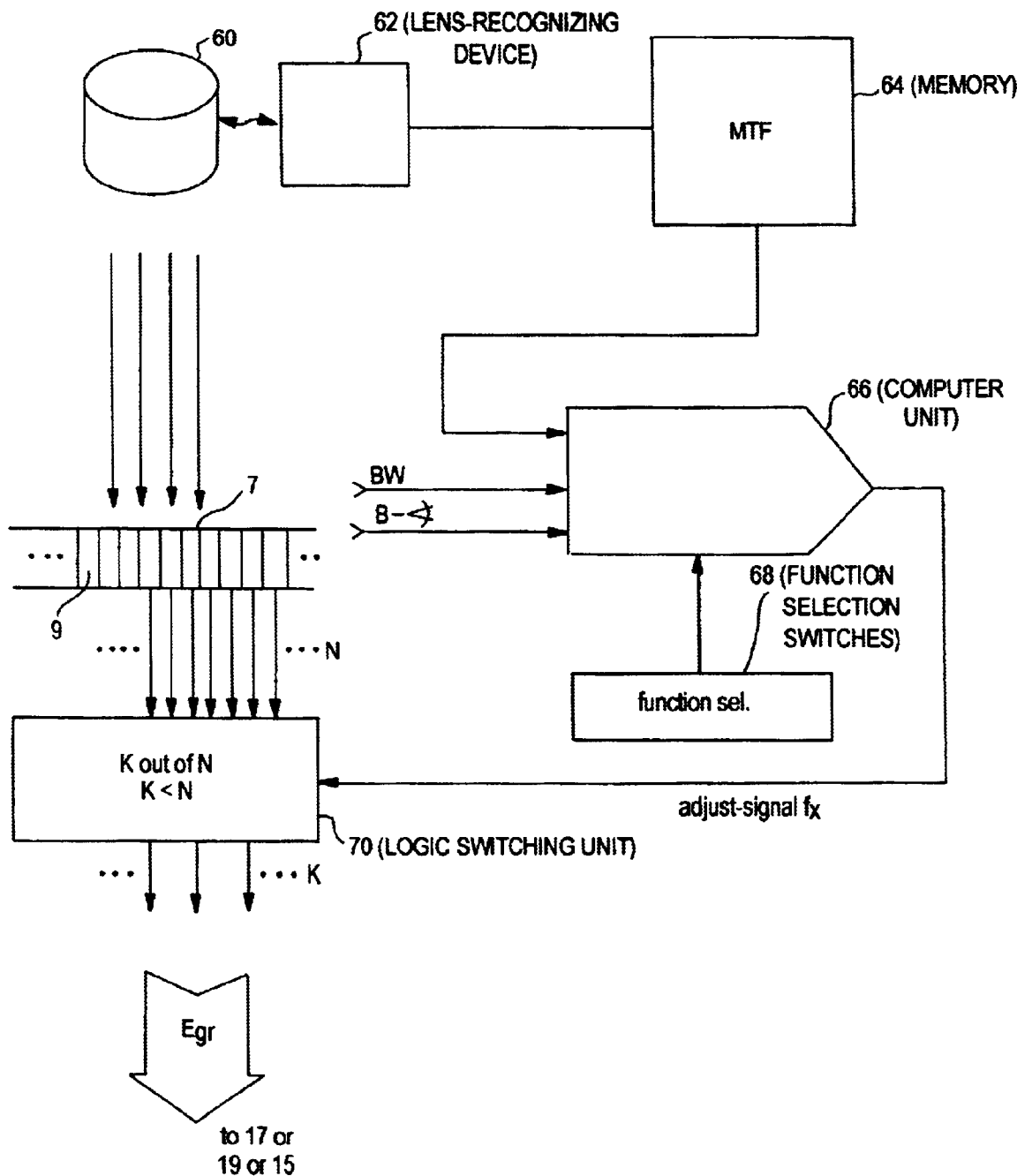
Figure 11:
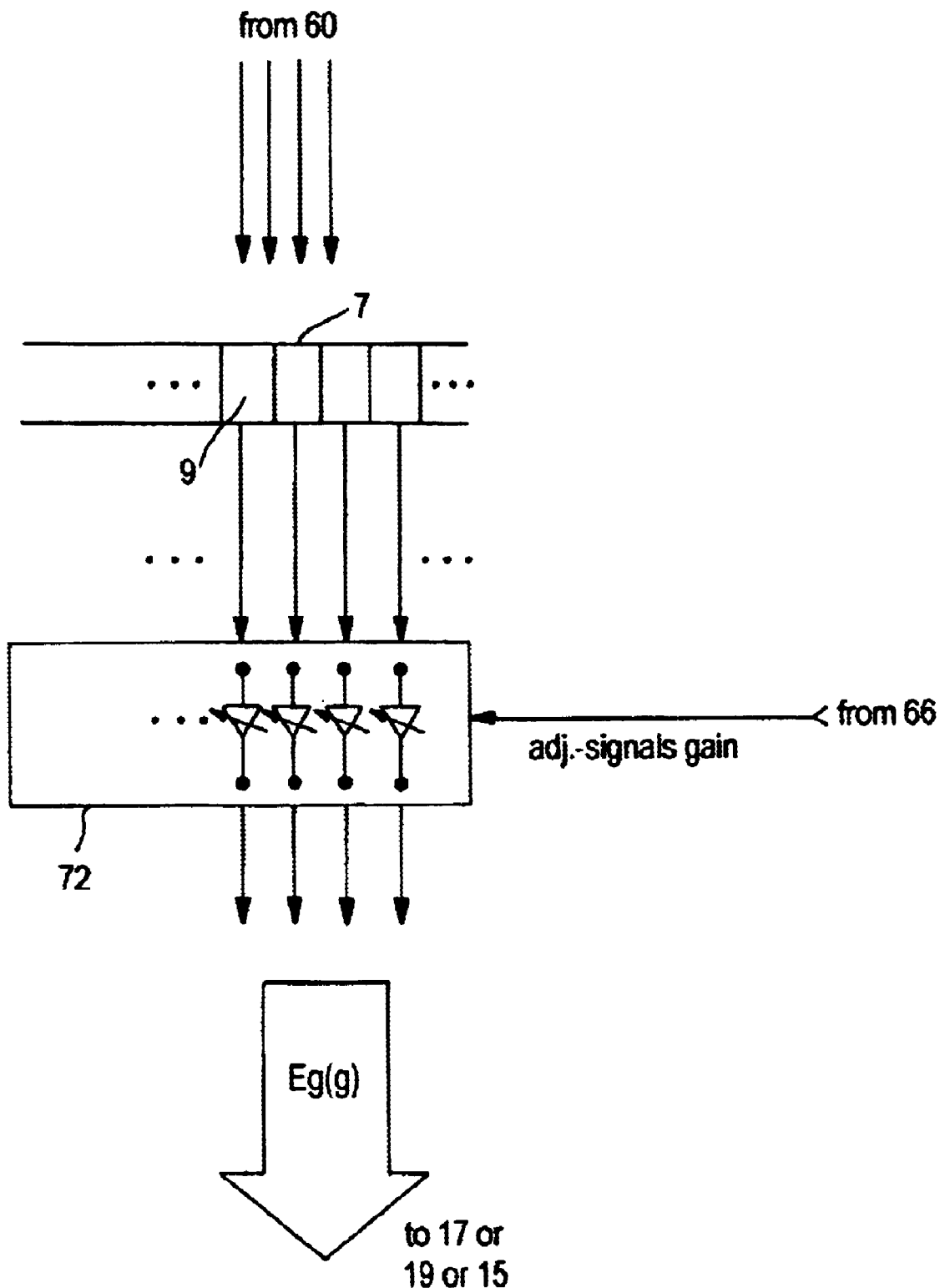

There is shown in:

FIG. 1 schematically, based on function blocks and signal flows, a first embodiment of the camera in accordance with the invention;

FIG. 2. based on a functionblock/signalflow-diagramm, a further preferred embodiment of the camera in accordance with the invention;

FIG. 3 proceeding from the camera explained based on FIG. 2, further development variants;

FIG. 4 proceeding from the development variants according to FIG. 3 of the camera in accordance with the invention, again based on a schematic function block/signalflow diagram, still further development variants of the camera in accordance with the invention;

FIG. 5 perspectively and simplified the design of a camera in accordance with the invention;

FIG. 6, purely qualitatively, courses of electrical signals at the output side of the transducer arrangement at a camera in accordance with the FIGS. 1 to 5, for explanation of a ACTUAL-focus determination and RATED-focus setting;

FIG. 7 based on a simplified signalflow/functionblock-diagram a ACTUAL-focus determining-and RATED-focus setting unit at a camera in accordance with the invention;

FIG. 8 a further embodiment of a ACTUAL-focus determining and RATED-focus setting unit of a camera in accordance with the invention;

FIG. 9 as example the course of modulation-transmittal functions MTF of a lens in function of aperture value, image angle and (broken lines) local frequency;

FIG. 10 based on a simplified signalflow/functionblock-diagram a modulation-transmission-changing unit at a camera in accordance with the invention, where-with a lens-given modulation-transmitting function can be changed;

FIG. 11 a positioning unit at a camera in accordance with the invention for a selective changing of a lens-given modulation transmitting function, in place of the setting unit foreseen at the embodiment according to FIG. 9.

In FIG. 1 a camera in accordance with the invention is illustrated schematically and in form of function blocks. It includes a casing 1 with lens 3 which defines in relation to the casing 1 the lens plane $E_o$. Basically, with the pivoting of the image plane the perspective of the image and the focus of the image is influenced. When pivoting the lens plane, merely the focus of the image is influenced. Accordingly, the image plane in the casing in accordance with FIG. 1 is pivotable in that the lens is supported to pivot relative to two axes $y_o$, $x_o$ which are fixed in relation to the casing. In order to set the focus the lens is adjustable in the direction z of the focus.

The image plane $E_B$, set by Cartesian coordinates $y_B$ and $x_B$ is defined by a planar, matrix like arrangement 7 of optoelectronic transducer elements 9, preferably by charge-coupled device-elements, CCD.

The substantially planar transducer arrangement 7 defined by the Cartesian coordinate axes $x_B$ and $y_B$ can, such as schematically illustrated at the suspension 11a, b, be supported to pivot around two fixed vertical axes $y_G$ and $x_G$ extending perpendicularly relative to each other such as illustrated relative to the axis $x_G$ by α and relative to the axis $y_G$ by β.

At a further embodiment the transducer arrangement 7 supported cardanically at the casing 1 can additionally be linearly displaceable in the directions of the axes $x_G$ and $y_G$. Furthermore, die image plane $E_B$ can be supported to also be displaceable together with the transducer arrangement 7 in the focus direction z.

Furthermore, such as illustrated schematically in FIG. 1, a positioning member arrangement 13a–f is foreseen with motor driven positioning members M, wherewith at least a part of the movements of the lens and/or transducer arrangement are positioned motor driven. The positioning members M foreseen in the positioning member unit 13 are controlled by incoming electrical control signals $e_a$–$e_f$.

Every sensor element 9, as an optoelectric transducer element, emits at the output side a output signal $e_9$, such that at a matrix of n×m sensor elements, such as again illustrated schematically in FIG. 1 by broken lines, the transducer arrangement 7 emits a output signal bundle $E_{9nm}$ of all n×m sensor elements. Furthermore, one or a plurality of gravity sensors 14 may be foreseen at the camera.

In FIG. 2 further preferred embodiments of the camera in accordance with the invention are illustrated in form of a signal flow/function block-diagram.

At a first further embodiment the output $E_{9nm}$ of the transducer arrangement 7 is operatively connected to a further transducer arrangement 15 which is formed (not illustrated) by a matrix like arrangement of r×s optoelectronical transducer elements. In a presently preferred embodiment this transducer arrangement is a LCD-screen; it may be, however, also a planar image screen of integrated transducer transistors.

Such as illustrated schematically, die transducer arrangement 15 is bound to the casing as image viewing screen, and merely e.g. for an optimal viewing comfort, be adjustable regarding its position. Due to the reverse or back, resp. transducing of the electrical output signals of the transducer arrangement 7 it is possible to view the image at the transducer arrangement 15 similar as at a view finder of a camera. By means of this the transducer arrangement 15 operates among others as view finder.

This up to now described camera structure can be completed in further steps to further embodiments, of which the final phase of completion is illustrated in FIG. 2.

At a first further embodiment a window selecting unit 17 is interposed between the transducer arrangement 7 and the transducer arrangement 15. Operating basically as a muli-plexer unit a sub-unit n'×m' is selected out of the n×m signals $e_9$, of which the elements 9 are positioned planarly interconnected at predeterminable position $x_{B1}$, $y_{B1}$ relative to the transducer plane of the transducer arrangement 7.

Therewith, an amount of signals $e_9$ of the number n'×m' appears at the output side of the window selection unit 17, which correspond to the output signals of a planarly interconnected number of sensors 9, of which the entirety is identified in FIG. 2 by $E_{9n'm'}$. Control signals $e_{m'}$, $e_{n'}$ are fed to the window selecting unit 17 for a setting of the size of the window, as well as $e_{xB1}$ and $e_{yB1}$, latter in order to set the position of the window in relation to the plane of the transducer arrangement 7.

Therefore, by means of the control signals which are fed to the window selection unit 17, the position of the window and the size of the window is thus defined.

Although in case of a not too small size of the window the total signal $E_{9n'm'}$ may be fed directly to the transducer unit 15, a allocating unit 19 is interposed in accordance with a further preferred embodiment between the output of the selecting unit 17 and the input of the transducer arrangement 15. This unit 19 has an actual zoom function.

A enlarging relation is inputted at a control input $e_v$, and the unit 19 allocates, operating again in form of a multiplexer unit, the input signals corresponding to $e_9$, to respective transducer elements at the transducer arrangement 15. By means of this the selected window can be enlarged or broadened, resp. and reduced by m'×n' signals to a arbitrarily selectable size at the transducer plane of the transducer arrangement 15. For instance, in case of enlarging, a plurality of the transducer elements at the transducer arrangement 15 are activated in the same way, depending from the factor V of the enlargement by one of the single signals $e_9$ from $E_{9n'm'}$. By means of this an electronic zoom function is realized without having to adjust anything at the lens.

In FIG. 3 further variants of additional additions of the still photographic camera according to the invention and explained based on FIG. 2 are illustrated. The entirety of the signals $e_9$, i.e. according to FIG. 2 $E_{9n'm'}$, which define the window of the size n'×m'., is electronically checked at a computer unit 21 integrated in the casing 1, at a focus judging unit 23, for instance based on signal gradients, to determine if the focus of the electronic image is sufficient. Should the focus not meet presettable criterions, the focus-judging unit 23 will act at its output side via control signals $e_{a, b, c}$ onto the setting members 13a, b, c, wherewith in the sense of a control circuit the position of the lens 3 and accordingly the lens plane $E_o$ are adjusted until the RATED-focus has been found.

Prior to this the image plane $E_B$ is set by means of the setting members 13d, e, f.

A preferred kind of the functioning of the focus judging- and setting unit 23 according to FIG. 3 shall be explained based on the FIGS. 6 to 8.

Figure 6A:
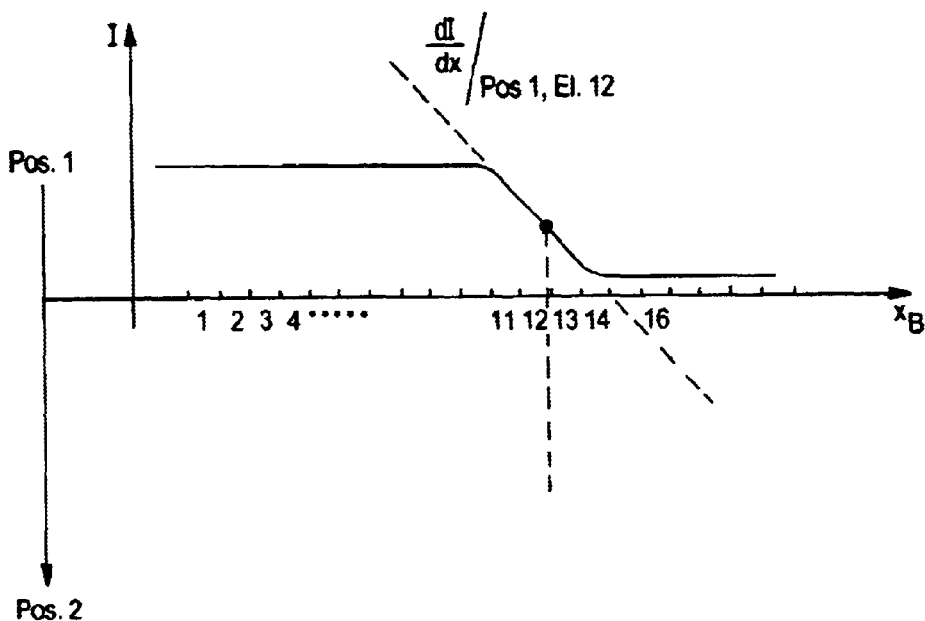

In FIG. 6a the corresponding, numbered transducer elements 9 are written over a location coordinate xB at the transducer element 7. The I-axis identifies the instant intensity or amplitude of the output signals $e_9$ or, in case of window operation, of the corresponding signals $E_{9n'm'}$ according to FIG. 2. The course of the intensity $I(x_B)$ at the transducer elements is illustrated in a purely qualitative manner.

As value of the prevailing focus the gradient dI/dx of the intensity is determined in a first relative position $POS_1$ between lens 3 and transducer arrangement 7. Obviously, it is thereby not solely this gradient which is determined at a one-dimensional succession of transducer elements 9, but rather, two-dimensionally, at a plurality of gradients around areas of transducer elements 9 belonging together and being controlled with a substantially same intensity.

With a view to FIG. 7 the determining of the gradients proceeds at a computer unit 40, preferably at a camera computer which is also foreseen for other duties.

In order to determine the focus and to automatically or manually trigger the optimizing of the focus the relative position of lens 3 and transducer arrangement 7 is set, at a preferred embodiment triggered e.g. by the computer unit 40 and via corresponding of the positioning members 13 in the direction of focusing $\Delta_{OB}(z)$, corresponding to $POS_1$. The gradients determined at $POS_1$ are saved at a memory unit 42. Thereafter, e.g. triggered by the computer unit 40 and via mentioned positioning members 13, the relative position of $\Delta_{OB}$ is adjusted, corresponding to $POS_2$ of FIGS. 6 and 7.

Because due to a change of the focusing, i.e. of $\Delta_{OB}(z)$, also a shifting $\Delta x$ of the optically incoming image at the transducer arrangement occurs, it is necessary to take this displacement $\Delta x$ for the subsequent judging of the change of the intensity gradients, which are registered in $POS_1$ and saved in the memory unit 42.

Figure 6B:
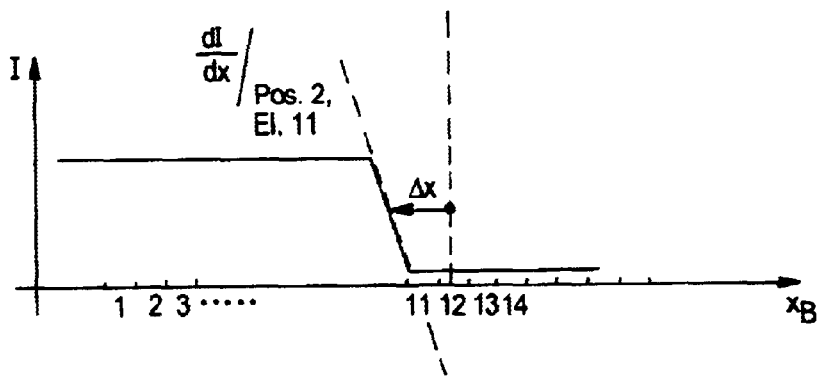

Such as is illustrated in FIG. 6b, a shifting $\Delta x$ of the gradient to be followed to other areas of the transducer element occurs due to the transition from $POS_1$ in $POS_2$, in addition to the change of the value of the gradient.

The change $\Delta x$ of the allocation between optically incoming image elements and transducer elements 9 at a given change of the focus, corresponding to $\Delta_{OB}$ is known, such that the computer unit 40 registers the now prevailing intensity gradients and stores them in a memory unit 44 where they thus now are present whereby the measure $\Delta x$ of the shifting according to FIG. 6b is taken into consideration.

An automatic following of the gradients registered in $POS_1$ in relation to the measure of the shifting around $\Delta x$ is also possible.

Figure 6C:
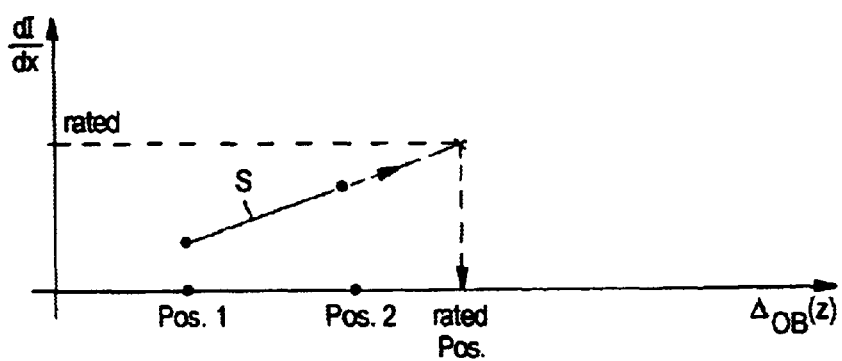

From the gradient values which are now stored in the memory units 42 and 44 for the at least two settings of the focus, as supporting values, the RATED-position or RATED-focus setting, resp. is concluded such as illustrated in FIG. 6c by interpolation or, as specifically illustrated, by extrapolation.

In accordance with FIG. 7 the gradient supporting values from the memory units 42 and 44 are fed in addition to the supporting value-position-difference $\Delta_{OB}$ to a computer unit 46, again preferably at the camera computer, which computes based on the focusing position/focus relation s computed by the two supporting values the focusing-RATED-setting corresponding to $\Delta_{OB}$ RATED and controls same via the positioning members 13. By means of this it is now possible that a ACTUAL-focus value is automatically and speedily corrected to the RATED-value, either as final setting prior to saving the image or as new ACTUAL-setting with a relatively small control deviation, RATED-focus minus ACTUAL-focus, in order to find from the found RATED-position, again by the described procedure, still more precisely the demanded RATED-focus position.

Because for a computing of the RATED-focusing in this procedure only at least two focusing supporting values must be set and computed, a judging and an optimizing of the focus can proceed very fast due to the high speed of calculating of the computer of the camera, which is of no detrimental significance. This is specifically advantageous when the setting image, from which the signal gradients for the judging of the focus are generated are actuated at a relatively small cadence, for instance due to a limited speed of the transducing of the transducer elements, which indeed is faster than the adjusting needed for a mechanical adjusting of the focus, but may be yet not sufficient without further ado for a continuous adjusting of the focus (scanning) for finding the RATED-focus.

When viewing FIG. 6 it can be seen quite easily that it is absolutely possible to proceed with the setting of the focus without an intervening at the optomechanical portion of the camera, but rather to carry out a needed correction purely in a signal technical way at the electrical output signals of the transducer arrangement 7, in that a ACTUAL-gradient which has been determined is electronically transformed for instance in accordance with FIG. 6a by a transforming of signals to the prerequisite gradient.

This procedure is illustrated schematically based on function blocks, analogue to FIG. 7, in FIG. 8.

The output signals $E_9$ of the transducer arrangement 7 or of a transducer arrangement window resp., are saved at a memory unit 48 and fed to the Computer unit 40' forming gradients analogue to the computer unit 40 of FIG. 7. At the output side of the computer unit 40' the momentarily present gradient conditions are stored at a memory unit 50 and compared at a comparing unit 54 with the RATED-gradient conditions stored at a memory unit 52. The resulting gradient deviations ΔG at the output of the comparing unit 54 control a signal forming unit 56 on which, controlled, the changes of the gradients illustrated based on FIGS. 6a and 6b are performed by a forming of signals.

Hereto the signals stored momentarily in the memory unit 48 are looped over the signal forming unit 56. The newly formed signal transmissions determined by means of the computer unit 40' are continuously compared with the RATED-conditions in the memory unit 42 until the differences ΔG appearing at the output of the comparing unit 54 reach preset minimal values.

Reverting back to FIG. 3, the signal $E_{9n'm'}$ or also the total signal $E_{9nm}$ is, additionally to the unit 23 or also alternatively, fed to a illumination judging unit 25 at the camera computer 21. In this unit, for instance based on the averaged intensity, all $E_{9n'm'}$ forming signals $e_9$ are examined to the effect whether the illumination intensity of the electronic image window meets presettable criteria. Output connectors are foreseen at the output side of the illumination judging unit 25 in order to allow a controlling of at least one illumination device 27 which can be controlled via these output connectors. Such may be, thereby, a continuous light source or a mixed light source for a continuous light or a flashlight. In this connection reference is made to the DE-A-31 52 272. By means of this the illumination at the illumination device 27 is also here set in a controlling sense that the criteria set at the illumination judging unit 25 are met.

Additionally, or again alternatively to the units 23 and 25, resp., a color judging unit 28 is foreseen in the camera computer 21. In order to obtain, in accordance with a presently preferred embodiment, the color information, narrow transmission strips, for instance in form of thinlayer filters are arranged for instance in front of sensor elements 9 distributed uniformly over the transducer surface of the transducer 7, and the output signals of these k×l foreseen in the window of the size m'×n' color selective sensor element output signals are judged at the. unit 28 in the camera computer 21. If necessary, the unit 28 can act at the output side onto filters to be switched in front of the illumination device 27 in order to selectively, depending from the criteria of the judgment at the device 27, control the color composition of the illumination light again in a regulating manner.

The set filters can also be foreseen at the camera in front of and/or after the lens.

It has been described with reference to FIG. 3 how the electronic image information relative to a set window of the size m'×n' can be further processed further at preferred embodiments of the still photographic camera in accordance with the invention.

In order now to set these mentioned criteria, that is focus, illumination an composition of color not only for one respective selected window, but optimally for larger picture portions or for the entire picture, the output of each of the foreseen units 23, 25, 27 is illustrated in FIG. 4 merely based on the example of the focus judging unit 23, loaded via a multiplexer unit 29 which can be controlled by the window selection by a control signal SF into a window value memory. Thus, at every window value memory 31 the results of the judgment of the focus and the results of the judgment of the illumination and the results of the judgment of the light colors, resp., are window specifically saved. A predeterminable number of the windows distributed over the transducer surface of the transducer arrangement 7 and selected at the unit 17 are sequentially fed to the entirety of the foreseen window value memory 31.

For the optimal setting of the picture over the entire transducer surface of the transducer arrangement 7, the values of a plurality of windows are judged at an optimizing and average setting, resp., unit 33 at the camera computer and now and not earlier the corresponding positioning signals e etc. are emitted.

Based on the procedure for the setting of a demanded focus or focus distribution over the image it already has been explained how at least one ACTUAL-value, there namely the ACTUAL-focus is obtained from the output signals of the transducer arrangement and how by intervention into the optomechanical path of the camera-intervention into the mechanical positioners—and/or into the electrical path-forming of signals—the image for obtaining at least one RATED image value, namely the RATED-focus or RATED-image distribution is changed.

From the literature, for instance from the pocket book "Bauelemente der Optik", H. Naumann, G. Schröder, Hanser publishing house, 4 Th. edition, 1983, chapter 12, Optical information transmittal and image quality, the term modulation-transmittal function or modulation-transfer function MTF is known, which is specifically objective specific.

Such a typical MTF-family is illustrated in FIG. 9. The modulation-transferfunction is e.g. defined by $$M = (E_{max} - E_{min})/(E_{max} + E_{min})$$

with E as "intensity of illumination" and is found from the modulation between the maximal intensity $E_{max}$ and the minimal intensity $E_{min}$ found based on test grids, such as is common for grades of modulations.

As can be seen in FIG. 9, the modulation transfer function MTF, which can range between 0% and 100%, depends from the set aperture value and also from the viewed image angle and depends further from the local frequency $f_x$ at the mentioned test grids defined by the value line-pair/mm (Lp/mm).

In FIG. 9 the MTF is illustrated in a purely qualitative manner in function of the aperture value for image angles 0°, in broken lines also for a local frequency of abt. $4f_x$, for $f_x$ being the local frequency for the curve family illustrated by full lines.

At the one side it is in many cases desired to shape the modulation transmission, for instance regarding its dependency from the aperture value and/or its dependency from the image angle, differently than pre-set by a given, objective being used, and/or it could be desired in case of a changing of the lens to keep the same modulation-transmitting conditions as had for the previous lens.

The effects of a modulation-transmitting function given by the objective used can be, such as illustrated for instance in FIG. 10 based on a function block/signal flow diagram, arbitrarily changed in accordance with the invention.

If, according to FIG. 10, the camera is to recognize on its own a respective mounted lens 60 in order to take the corresponding MTF into consideration, a lens-recognizing device 62 is foreseen such as illustrated schematically, which reads for instance a code marking at the lens. In a MTF-memory 64 MTF's which are specific of the lens are registered in function according to FIG. 9 for instance of image angle, B-angle, aperture size, BW, and local frequency fx. The family of curves which corresponds to the momentarily used lens is retrieved and fed to a computer unit 66, the camera computer. For instance by function selection switches 68 it is for instance manually prompted in which way the MTF given by the lens 60 shall be changed, for instance in such a manner that in case of a image angle B-angle of 43° a MTF dependency from the aperture value BW is arrived at, such as given by the lens 60 at a image angle of 0° (see FIG. 9).

The computer unit 66 changes basically in accordance with the input the effect of the lens specific MTF in that in the mentioned example the MTF given by the lens is corrected upwards at 43° image angle. For this task also the aperture value BW and respective image value B-angle which is under consideration are fed to the computer unit 66.

Such as mentioned above, the MTF depends on the local frequency. This local frequency can, however, such as illustrated in FIG. 10, decreased "electrically" in that by means of a selectively controllable logic switching element 70 the output signals of a plurality of transducer elements which are adjacent of each other, possibly with a forming of an average value (not illustrated) are combined to resulting output signals $E_{9r}$. By a decreasing of the local frequency $f_x$ the MTF is increased such as can be seen easily in FIG. 9. In case of a changing of the aperture value BW the computer unit 66 calculates at the example under consideration in which amount the respective local frequency $f_x$ must be decreased in order to obtain the same dependency from the aperture value at a image angle of 43° which, in fact, would be given by the objective at a image angle of 0°.

According to FIG. 9, therefore, at an aperture value of for instance 5, 6 the MTF is changed by the decrease of the local frequency from point $a_{43}$ into the point $b_{43}$, at an aperture value of for instance 22 from point $a_{22}$ into the point $b_{22}$.

It is also possible without any further ado to create other dependencies, such as for instance to set, that the image angle dependency is compensated at a given aperture value. In such case, such as follows by FIG. 9, a large reduction of the local frequency is made for instance at an aperture value 11, at transducer elements with a image angle of 105°, at increasingly smaller image angle correspondingly smaller reductions of the local frequency, such that at all image angles, for instance in accordance with point c, a almost 100% MTF results.

By means of this the possibility is given to preset desired modulation-transmitting functions in desired dependencies practically independent from lens-given modulation-transmitting functions.

In place of the intervention onto the local frequency $f_x$, such as realized with the selection- or combining unit in FIG. 10, a amplifier unit 72 with a controlled adjustable amplification or attenuation, resp,., can be switched in after each of the transducer elements 9. Analogue to the observations to FIG. 9 no intervention is made here onto the local frequency $f_x$, the computer 66 unit rather changes selectively the amplifications or attenuations, resp., switched in after the transducer elements 9 in order to obtain a desired MTF or MTF-dependency, resp.

In an analogue manner, for instance at the determining of the point coordinates of a cloud of points, in accordance with the DE-PS-34 33 412, the independent variables "aperture value" and "local frequency", could be set or varied, resp. for the respective image point coordinates to be focused in such a manner that a respective maximal modulation (100%) occurs. Furthermore, obviously the leaving of predetermined areas, for instance in relation to MTF, could first be announced by an alarm indication before the MTF-influence compensation is triggered manually. With a view on FIG. 9 it is for instance possible to announce at a monitored image angle of for instance 96°, if at a changing of the aperture value the MTF drops below a predetermined MTF, for instance below 60%.

Reverting back, in FIG. 5 a presently preferred structural embodiment of the camera in accordance with the invention is illustrated perspectively and schematically. The lens 3 is supported in the casing 1 in accordance with FIG. 1. At the reverse side the transducer arrangement 15 is foreseen with a surface section 35 on which the displays for the interactive communication between user and camera computer 21 take place. Furthermore, an optimal small number of operating buttons for operating the camera is foreseen, such, as illustrated in FIG. 5, preferably a mouse roller 37, for instance for adjusting and setting of windows, and also a modus selecting disc or modus selecting buttons 39 by means of which the effect modus of the mouse roller 37 can be changed.

A image storing medium, such as a mini-disc, can be, furthermore, integrated at the camera in accordance with the invention, and/or output connectors may be foreseen in order to couple thereto an external storage medium.

For the practical use, reverting back to FIG. 1, following combinations are preferred with the following priority:

1. Image plane and lens plane or transducer arrangement 7, resp., and lens 3 are pivotably supported in relation to the casing 1 of the camera and supported for a moving at least in the focusing direction z. Therewith, the viewer plane, formed by the transducer arrangement 15 according to FIG. 2 is fixed to the housing.

2. The lens plane or the lens, resp. is pivotably supported in relation to the casing 1 of the camera and supported for a moving at least in the focusing direction z. The viewer plane, determined by the transducer arrangement 15 according to FIG. 2, and also the image plane, deter mined by the transducer arrangement 7 are fixed to the camera. Possibly the image plane with the transducer arrangement 7 are supported thereby to be moveable in the focusing direction z. In this case the casing of the camera is pivoted and/or linearly shifted for the selection of the perspective of the image and/or the picture cut-out.

With the gravity sensor 40 illustrated in FIG. 1 the possibility is produced to recognize via the camera computer 21 automatically the position of the camera in relation to the vertical direction. This information can be evaluated in the computer of the camera e.g. as follows:

set edges of image parallel the vertical direction;

recognize if camera either in landscape or portrait format.

Recognize cut-outs which are obliquely relative to the vertical direction and recalculate them relative to the fixed pivoting geometry for the camera setting to a position which is aligned with the vertical direction;

influence vertical building lines by computer function variants with complete equalizing (picture plane vertical) and partial equalizing (either in function of the angle of tilt of the image taking axes or by a stepwise selection of the equalization to the vertical line);

influence horizontal building lines by pivoting of the image plane and accordingly the transducer arrangement 7 around the vertical line or stepwise changing of the horizontal course of the building lines.

What is claimed is:

1. An electronic still camera comprising:

a casing;

a lens mounted on said casing, said lens defining a lens plane relative to said casing;

an at least substantially planar two-dimensional first opto-electric transducer arrangement of optical-to-electric converter elements mounted on said casing for receiving an image from said lens, said optical-to-electric converter elements having inputs and electrical outputs and generating at said electrical outputs thereof concomittently a first electronic representation of an optical image received at said inputs;

an image viewer screen in the form of an electro-optical transducer arrangement of electrical-to-optical converter elements, said electrical-to-optical converter elements having electrical inputs and optical outputs and converting a second electronic representation of an image applied at said inputs thereof to an optical output image;

a window-selecting unit interconnected between said electrical outputs of said optical-to-electrical converter elements and said electrical inputs of said electrical-to-optical converter elements, said window-selecting unit selecting a size of a part of said first electronic representation for forming said second electronic representation by selecting a number of outputs of said optical-to-electrical converter elements which are communicated in parallel to inputs of said electrical-to-optical converter elements, said window-selecting unit further selecting position of said part of said first electronic representation in said electronic representation.

2. The camera according to claim 1, wherein said E/O-transducer arrangement is an LCD-screen or an active planar screen.

3. The camera according to claim 1, wherein said lens is supported to pivot relative to said casing around two mutually perpendicular axes.

4. The camera according to claim 1, wherein said O/E-transducer arrangement is supported to pivot around two mutually perpendicular axes.

5. The camera according to claim 1, wherein at least one of said lens and said O/E-transducer arrangement is linearly displaceable in a focal direction of said camera.

6. The camera according to claim 4, wherein said O/E-transducer arrangement is linearly displaceable in a direction of at least one of said two axes.

7. The camera according to claim 1, wherein at least one of said O/E-transducer arrangements and said lens is movable with respect to said casing and further comprising a motor drive arrangement for moving said at least one of said O/E-transducer arrangement and said lens.

8. The camera according to claim 1, wherein a window-selecting unit is interconnected between said O/E-transducer arrangement and said E/O-transducer arrangement, said window-selecting unit comprising control inputs, at least a part of said control inputs controlling which of said output signals of said O/E-elements of said O/E-transducer arrangement are fed to said E/O-transducer arrangement.

9. The camera according to claim 8, wherein at least a part of said control inputs control to which E/O-elements of said E/O-transducer arrangement output signals of said O/E-elements of said O/E-transducer arrangements are fed.

10. The camera according to claim 9, wherein at least a part of said control inputs control the number of E/O-elements to which respective single ones of the output signals of said O/E-elements are fed.

11. The camera according to claim 1 wherein outputs of said O/E-elements are operationally connected to at least one of a focus-judging unit, an illumination-judging unit, and a color-judging unit.

12. The camera according to claim 11, wherein a window-selecting unit is interconnected between said O/E-transducer arrangement and said at least one unit.

13. The camera according to claim 11, wherein output signals of said O/E-elements are operationally connected to a focus-judging unit, the output thereof acting via a motor drive on a positioning arrangement for said lens.

14. The camera according to claim 11, wherein output signals of said O/E-elements are operationally connected to an illumination-judging unit generating output signals for controlling at least one illumination source.

15. The camera according to claim 11 wherein output signals of said O/E-elements are operationally connected to inputs of a color-judging device for generating thereat input signals, said input signals being significant for the spectral composition of light impinging on said O/E elements, said color-judging unit generating output signals for setting a spectral color composition of illuminational light for imaging.

16. The camera according to claim 11, wherein outputs of said at least one unit are operationally connected to inputs of memory means.

17. The camera according to claim 16 further comprising said window-selecting unit being interconnected between outputs of said O/E-elements and said at least one unit, and further comprising a selection unit for selectively connecting output signals of said at least one unit to separate areas of said memory means according to windows selected by said window-selecting unit.

18. The camera according to claim 16, wherein outputs of said memory means are operationally connected to inputs of an optimizing unit generating control signals operationally connected to at least one of a motor driven positioning arrangement for at least one of said lens and of said O/E-transducer arrangement and of for controlling an illumination source.

19. The camera according to claim 1 further comprising an erasable data storage operationally connected to the output of said O/E-elements.

20. The camera according to claim 1, further comprising a camera computer operationally connected to said E/O-transducer arrangement for displaying information from said computer.

21. The camera according to claim 1, further comprising at least one gravity sensor.

22. The camera according to claim 1, wherein outputs of said O/E-elements are operationally connected to a focus-judging unit, said focus-judging unit sequentially controlling mutual positioning of said lens and said O/E-transducer arrangement for two different mutual positions, and wherein said focus-judging device determines, in said two positions, gradients between output signals of adjacent O/E-elements or adjacent groups of O/E-elements and determines from said gradients at said two positions a desired mutual position of said lens and said O/E-transducer arrangement for a rated focus by interpolation or extrapolation, and wherein further said focus-judging unit controls subsequently said mutual positioning according to said mutual positioning for said rated focus.

23. The camera according to claim 1, wherein output signals of sid O/E-elements are operationally connected to an input of a focus-judging unit, said focus-judging unit determining a gradient or gradients of output signals of adjacent O/E-elements or adjacent groups of O/E-elements, and wherein said focus-judging unit generates an output signal operationally connected to a motor drive for mutually positioning said lens and said O/E-transducer arrangement so long until said gradient or gradients determined have reached a rated value or a rated value distribution.

24. The camera according to claim 1, further comprising a controllable combining unit, the input thereof being operationally connected to outputs of O/E-elements, said controllable combining unit selectively combining at least two output signals of adjacent O/E-elements or of adjacent groups of O/E-elements or of adjacent groups of O/E-elements to a single output signal.

25. The camera according to claim 24, wherein said combining unit averages said signals of said at least two adjacent elements or adjacent groups of elements to form said output signal of said combining unit.

26. The camera according to claim 24, further comprising a camera computer being operationally connected to control inputs of said combining unit.

27. The camera according to claim 1, further comprising at least one of controllable amplifiers and of controllable attenuators operationally connected to outputs of said O/E-elements.

28. The camera according to claim 27, wherein said at least one of controllable amplifiers and of controllable attenuators are controlled by a camera computer.

29. The camera according to claim 1, further comprising a camera computer and a memory device for storing modulation transmission of at least one lens, the output of said memory device being operationally connected to inputs of said camera computer, said camera computer generating output signals operationally connected to amplifier and/or attenuation means operationally connected to outputs of said O/E-elements in order to change the memorized modulation transmission of a lens with respect to its effect on the output signal of said O/E-elements.

30. The camera according to claim 1, including means for adjustably mounting said image viewer screen on said casing.

31. An electronic still camera comprising:

a casing;

a lens pivotally mounted on said casing so as to pivot around two mutually perpendicular axes, said lens defining a lens plane relative to said casing;

an at least substantially planar two-dimensional first opto-electric transducer arrangement of optical-to-electric converter elements mounted on said casing for receiving an image from said lens, said optical-to-electric converter elements having inputs and electrical outputs and generating at said electrical outputs thereof concomittently a first electronic representation of an optical image received at said inputs;

an image viewer screen in the form of an electro-optical transducer arrangement of electrical-to-optical converter elements, said electrical-to-optical converter elements having electrical inputs and optical outputs and converting a second electronic representation of an image applied at said inputs thereof to an optical output image and to which at least a part of the electrical output signals of said optical-to-electric converter elements are communicated; and a window-selecting unit interconnected between said electrical outputs of said optical-to-electrical converter elements and said electrical inputs of said electrical-to-optical converter elements, said window-selecting unit selecting a size and positioning of said second electronic representation out of said first electronic representation being communicated to said inputs of said electrical-to-optical converter elements.

32. An electronic still camera comprising:

a casing;

a lens mounted on said casing, said lens defining a lens plane relative to said casing;

an at least substantially planar two-dimensional first opto-electric transducer arrangement of optical-to-electric converter elements mounted on said casing for receiving an image from said lens, said first opto-electric transducer arrangement being pivotable around two mutually perpendicular axes, said optical-to-electric converter elements having inputs and electrical outputs and generating at said electrical outputs thereof concomittently a first electronic representation of an optical image received at said inputs;

an image viewer screen in the form of an electro-optical transducer arrangement of electrical-to-optical converter elements, said electrical-to-optical converter elements having electrical inputs and optical outputs and converting a second electronic representation of an image applied at said inputs thereof to an optical output image and to which at least a part of the electrical output signals of said optical-to-electric converter elements are communicated; and a window-selecting unit interconnected between said electrical outputs of said optical-to-electrical converter elements and said electrical inputs of said electrical-to-optical converter elements, said window-selecting unit selecting a size and positioning of said second electronic representation out of said first electronic representation being communicated to said inputs of said electrical to optical converter elements.

33. An electronic still camera comprising:

a casing;

a lens mounted on said casing, said lens defining a lens plane relative to said casing;

an at least substantially planar two-dimensional first opto-electric transducer arrangement of optical-to-electric converter elements mounted on said casing for receiving an image from said lens, said optical-to-electric converter elements having inputs and electrical outputs and generating at said electrical outputs thereof concomittently a first electronic representation of an optical image received at said inputs;

an image viewer screen in the form of an electro-optical transducer arrangement of electrical-to-optical converter elements, said electrical-to-optical converter elements having electrical inputs and optical outputs and converting a second electronic representation of an image applied at said inputs thereof to an optical output image and to which at least a part of the electrical output signals of said optical-to-electric converter elements are communicated;

a window-selecting unit interconnected between said electrical outputs of said optical-to-electrical converter elements and said electrical inputs of said electrical-to-optical converter elements, said window-selecting unit selecting a size and positioning of said second electronic representation out of said first electronic representation being communicated to said inputs of said electrical to optical converter elements;

wherein outputs of said O/E-elements are operationally connected to a focus-judging unit, said focus-judging unit sequentially controlling mutual positioning of said lens and said O/E-transducer arrangement for two different mutual positions, and wherein said focus-judging device determines, in said two positions, gradients between output signals of adjacent O/E-elements or adjacent groups of O/E-elements and determines from said gradients at said two positions a desired mutual position of said lens and said O/E-transducer arrangement for a rated focus by interpolation or extrapolation, and wherein further said focus-judging unit controls subsequently said mutual positioning according to said mutual positioning for said rated focus.

34. An electronic still camera comprising:

a casing;

a lens mounted on said casing, said lens defining a lens plane relative to said casing;

an at least substantially planar two-dimensional first opto-electric transducer arrangement of optical-to-electric converter elements mounted on said casing for receiving an image from said lens, said optical-to-electric converter elements having inputs and electrical outputs and generating at said electrical outputs thereof concomittently a first electronic representation of an optical image received at said inputs;

an image viewer screen in the form of an electro-optical transducer arrangement of electrical-to-optical converter elements, said electrical-to-optical converter elements having electrical inputs and optical outputs and converting a second electronic representation of an image applied at said inputs thereof to an optical output image and to which at least a part of the electrical output signals of said optical-to-electric converter elements are communicated;

a window-selecting unit interconnected between said electrical outputs of said optical-to-electrical converter elements and said electrical inputs of said electrical-to-optical converter elements, said window-selecting unit selecting a size and positioning of said second electronic representation out of said first electronic representation being communicated to said inputs of said electrical to optical converter elements;

wherein output signals of said O/E-elements are operationally connected to an input of a focus-judging unit, said focus-judging unit determining a gradient or gradients of output signals of adjacent O/E-elements or adjacent groups of O/E-elements, and wherein said focus-judging unit generates an output signal operationally connected to a motor drive for mutually positioning said lens and said O/E-transducer arrangement so long until said gradient or gradients determined have reached a rated value or a rated value distribution.

* * * * *